(12) United States Patent
Rizk et al.

(10) Patent No.: US 10,704,665 B2
(45) Date of Patent: Jul. 7, 2020

(54) FLUID ROTARY JOINT AND METHOD OF USING THE SAME

(71) Applicant: RE2, Inc.

(72) Inventors: Nabil Michael Rizk, Pittsburgh, PA (US); Gregory D. Danyo, Pittsburgh, PA (US); Andrew B. Mor, Pittsburgh, PA (US)

(73) Assignee: RE2, Inc., Pittsburgh, PA (US)

( * ) Notice: Subject to any disclaimer, the term of this patent is extended or adjusted under 35 U.S.C. 154(b) by 615 days.

(21) Appl. No.: 15/612,578

(22) Filed: Jun. 2, 2017

(65) Prior Publication Data
US 2017/0350492 A1    Dec. 7, 2017

Related U.S. Application Data

(60) Provisional application No. 62/345,425, filed on Jun. 3, 2016.

(51) Int. Cl.
*F16H 49/00* (2006.01)

(52) U.S. Cl.
CPC ................... *F16H 49/001* (2013.01)

(58) Field of Classification Search
CPC .................................................... F16H 49/001
USPC .......................................................... 74/640
See application file for complete search history.

(56) References Cited

U.S. PATENT DOCUMENTS

| | | | | |
|---|---|---|---|---|
| 3,088,333 A | * | 5/1963 | Musser | F16H 49/001 74/640 |
| 3,523,488 A | * | 8/1970 | Robinson | F16H 49/001 91/180 |
| 4,425,822 A | * | 1/1984 | Marschner | F16H 57/04 74/640 |
| 4,479,403 A | * | 10/1984 | Marschner | F16H 57/04 74/640 |
| 4,833,941 A | | 5/1989 | Leppanen et al. | |
| 5,060,539 A | | 10/1991 | Cissell et al. | |
| 5,984,048 A | * | 11/1999 | Kiyosawa | F16H 49/001 184/6.12 |

OTHER PUBLICATIONS

Images Captured from YouTube videos titled "Harmonic Dive Video" at www.youtube.com/watch?v=SQGjC9I1SSQ as of May 26, 3016.

* cited by examiner

*Primary Examiner* — Ha Dinh Ho
(74) *Attorney, Agent, or Firm* — The Webb Law Firm (57) ABSTRACT

A fluid rotary joint has a stator with a generally curved stator body and a flex spline with a flexible annular band disposed about and secured to the stator body. The stator also has at least three radially extendable members disposed between the stator body and the annular band to deform the annular band away from the stator body to contact the inner surface of a rotor. The inner circumference of the rotor is greater than the outer circumference of the annular band. A driver selectively expands the extendable members and brings the annular band of the stator into frictional driving engagement with the rotor for rotating the rotor. The extendable members may also be selectively extended to allow the stator and rotor to freely move with respect to one another or to have limited contact with one another to act as a torque limiting device.

18 Claims, 12 Drawing Sheets

FIG. 1

PRIOR ART

FLUID ROTARY JOINT AND METHOD OF USING THE SAME

CROSS REFERENCE TO RELATED APPLICATIONS

This application claims the benefit of U.S. provisional application No. 62/345,425, filed Jun. 3, 2016, the contents of which are incorporated in its entirety herein by reference.

STATEMENT REGARDING FEDERALLY SPONSORED RESEARCH

This invention was made with government support under Contract No. N00014-15-P-1130 awarded by the Office of Naval Research. The government has certain rights in the invention.

BACKGROUND OF THE INVENTION

Field of the Invention

This invention relates to a strain wave actuator and, more particularly, to a fluid rotary joint using a strain wave actuator with an annular band instead of gears typically associated with a harmonic drive.

Description of Related Art

Figure 1:
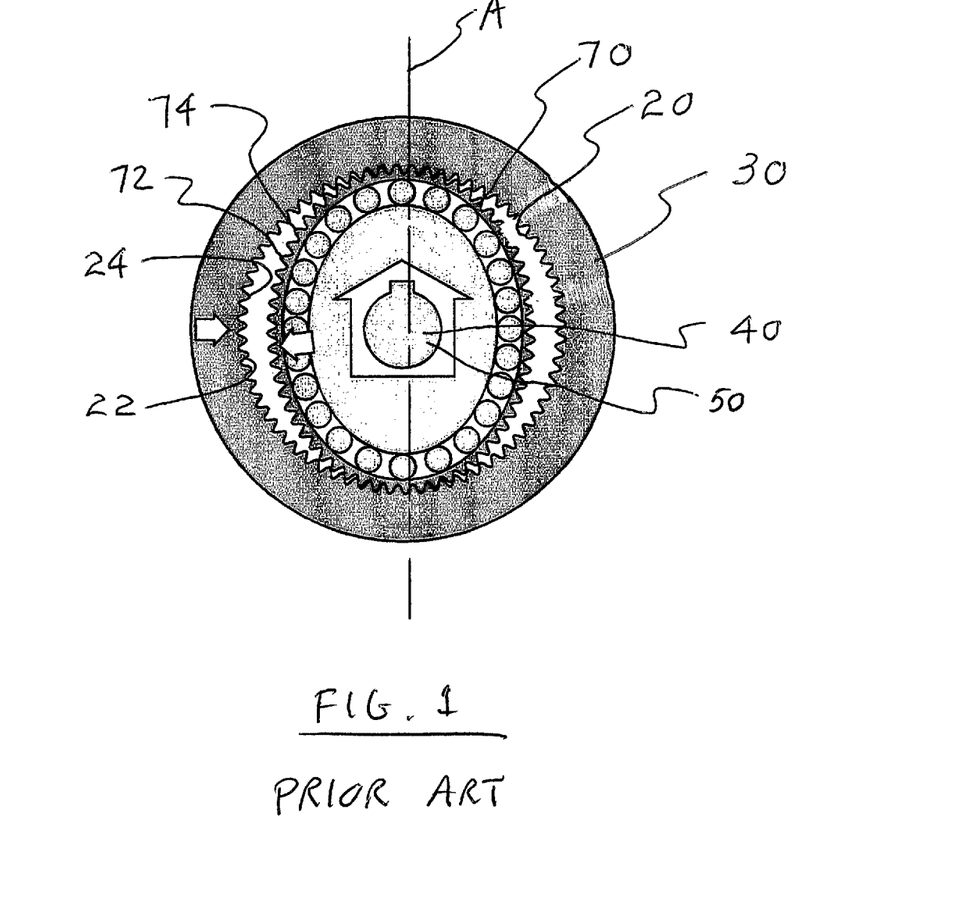
FIG. 1 is a prior art sketch showing the operation of a harmonic drive motor utilizing gears.

Directing attention to FIG. 1, a harmonic motor drive 10 typically utilizes three main components to reduce the speed of the input rotation of a wave generator and increase torque. Typical operation has a circular spline 20 fixed to the motor stator 30, a wave generator 40 attached to the output of the motor rotor 50, and the flex spline 70 as the output of a gearbox. The flex spline 70 has an oval shape where the major axis A of the oval is rotated by the wave generator 40. It is commonly stated in harmonic drive trade literature that the difference in the number of teeth 22, 72 between the outside 74 of the flex spline 70 and the inner surface 24 of the circular spline 20 generates the motion of the output. The flex spline 70 and circular spline 20 may have the same gear pitch and different circumferences so that the flex spline 70 must have fewer teeth 72 to mesh with the teeth 22 of the circular spline 20. However, more fundamentally, it is the difference in the circumference of the flex spline 70 relative to the circular spline 20 that produces the gear reducer effect whether gear teeth are present or not. The gear ratio is a function of the difference in the circumference of the two gears 22, 72 and is entirely independent of the tooth size since the number of teeth in each gear is directly related to their pitch diameters. The teeth, therefore, could be made of infinitesimal size, or in fact there may be no teeth at all, with merely frictional contact engagement. The gear ratio will not be affected in the least by any such change in construction. The number of complete strain wave revolutions around the strain gear for one revolution of the output element is equal to the difference in pitch diameter of the driven element. This may also be presented in the following equation: Gear Ratio=(Ø Circular Spline)/(Ø Circular Spline−Ø Flex Spline). A traditional harmonic gearbox uses a mechanical gear wave generator to deform the flex spline into the circular spline.

SUMMARY OF THE INVENTION

In one embodiment, a fluid rotary joint has a stator with a generally curved stator body and a flex spline with a flexible annular band disposed about and secured to the stator body. The annular band has an outer surface with an outer circumference and a high tensile strength in the direction of the circumference. The stator also has at least three radially extendable members disposed between the stator body and the annular band to deform the annular band away from the stator body. The rotary joint also has a generally cylindrical rotor surrounding the stator body, wherein the rotor has a wall with an inner surface having an inner circumference. The outer circumference of the annular band is less than the inner circumference of the rotor. A driver selectively expands the extendable members and brings the outer surface of the annular band of the stator into frictional driving engagement with the inner surface of the rotor for rotating the rotor.

Another embodiment is directed to a method for using the fluid rotary joint comprising the steps of:

a) expanding at least one of the at least three radially extendable members at a pressure greater than the remaining members to deform the band against the inner surface of the rotor thereby providing friction between the band and the inner surface of the rotor; and b) increasing pressure on an adjacent extendable member and relieving the pressure on the at least one extendable member to create relative motion between the annular band and the rotor.

These and other features and characteristics of a fluidic roll joint, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only, and are not intended as a definition of the limits of the disclosure. As used in the specification and the claims, the singular form of "a", "an", and "the" include plural referents unless the context clearly dictates otherwise.

DESCRIPTION OF THE DISCLOSURE

For purposes of the description hereinafter, the terms "upper", "lower", "right", "left", "vertical", "horizontal", "top", "bottom", "lateral", "longitudinal", and derivatives thereof, shall relate to the invention as it is oriented in the figures. However, it is to be understood that the invention may assume alternative variations and step sequences, except where expressly specified to the contrary. It is also to be understood that the specific systems and processes illustrated in the attached drawings, and described in the following specification, are simply exemplary aspects of the disclosure. Hence, specific dimensions and other physical characteristics related to the aspects disclosed herein are not to be considered as limiting.

The present disclosure addresses the development of a lightweight fluidic rotary joint capable of continuous rotation.

The present disclosure provides a fluidic harmonic rotary joint capable of continuous motion, predictable small-step angles, and significant torque production. The demonstrated joint has a 0.22° step size enabling precise orientation control, and is capable of producing over 8 ft-lbs of torque. The design utilizes low-cost pneumatic actuators and an inexpensive friction material to transfer torque across the joint rather than the more typical, expensive, toothed surface. The low-cost design combined with the fluidic drive mechanism make this an improvement for producing roll motion for pneumatic or hydraulic robotic systems.

A fluidic rotary joint is a significant development for fluidic actuators because it has the ability to rotate with small precision angle steps continuously in either direction or hold static torque indefinitely in any orientation while energized only by a relatively low pressure fluidic source. Furthermore, the motion generated is rotation-only, eliminating the axial motion-coupling characteristic of some other fluidic torsional actuators.

Extensive analysis and experience has demonstrated the need for a torsional actuator at the end of a manipulator. The prior art acknowledges the need for torsional actuator capability for manipulators, but also concedes that many current actuators have not been torque tested, have limited ranges of motion, and couple axial motion with rotational motion. In one aspect, the fluidic rotary joint provided in the present disclosure is an actuator that may be made of lightweight materials and driven with non-proportional on-off valves for continuous rotation in either direction. In one aspect, the joint itself may not be inflatable, but rather, it may add continuous torque capability to an otherwise inflatable system. The concept for actuation is rooted in established strain wave gear reducer principles. However, there are two major points of departure for the fluidic rotary joint of the present disclosure that inspired the need to build hardware and demonstrate that the flex spline may be driven by multiple discrete pneumatic chambers instead of an oval shaped continuous wave generator and torque may be transmitted through friction instead of gear teeth.

The fluidic rotary joint of the present disclosure is a modification of the more typical motor driven harmonic drive that utilizes a toothed interface between the flex spline and the circular spline. The present disclosure takes advantage of the most fundamental principle of strain wave gearing to eliminate an expensive toothed interface and replace it with a friction/shear torque transfer interface. Along with removing the gear teeth, the present disclosure implements a simple fluidic rotational drive to remove the need for a motor at the joint. The hardware implementation of these improvements reduces cost, weight, and complexity.

Figure 2:
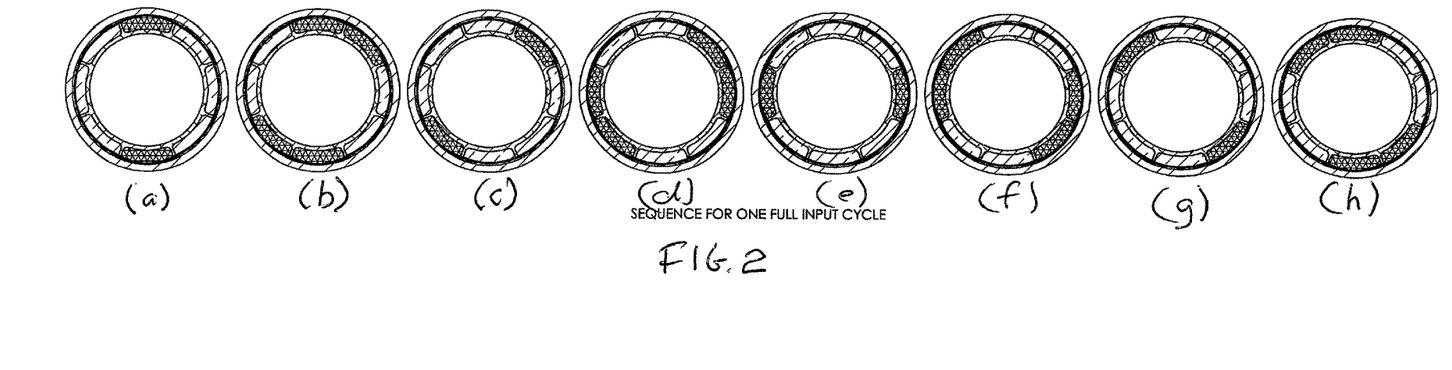
FIG. 2 shows the sequence (a)-(h) of inflations and deflations generating a clockwise wave pattern to create continuous rotation of the rotor in the opposite direction.

The operation utilizes two adjacent sets of opposing diaphragms in order to press a rubber material attached to the flex spine into the circular spline. A design to actuate the harmonic drive was developed utilizing COTS pneumatic diaphragms to deform the flex spline as a departure from the traditional oval shaped wave generator. To generate rotational motion, one set out of two of the opposing diaphragms will remain pressurized as a pivot point while the pressurized adjacent set is vented and, simultaneously, the vented adjacent set is pressurized. The sequence is repeated to produce rotary motion in either the clockwise or counterclockwise direction, as shown in FIGS. 2(a)-2(h). The joint will also resist static torques as the pressure is held constant in the set of opposing diaphragms. Unlike a typical harmonic drive, there is only one moving part in this design of the present disclosure. The wave motion required to generate the motion between the flex spline and the circular spline is generated by the diaphragms, which are fixed relative to the flex spline. With reference to FIG. 2, fluidic harmonic actuator cell sequencing is shown.

Figure 2A:
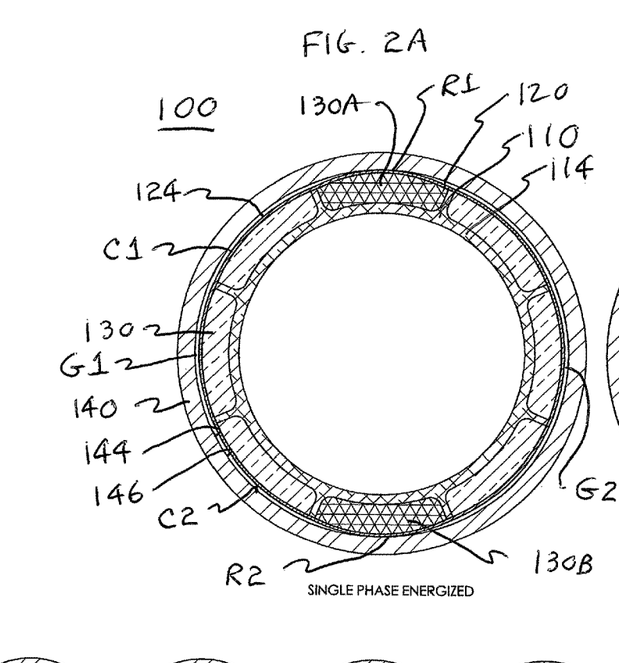
FIGS. 2A and 2B are schematics depicting a fluidic harmonic actuator cell sequencing, from one pair of extendable members to two pairs being inflated, causing the rotor to turn slightly.

Overall, FIG. 2A illustrates a fluidic rotary joint 100 with a stator 110 having a generally curved stator body 114. The stator 110 also has a flexible annular band 120 disposed about the stator body 114. The annular band 120 has an outer surface 124 with an outer circumference C1 and a high tensile strength in the direction of the circumference C1. The stator 110 further has a plurality of radially extendable members 130 disposed between the stator body 114 and the annular band 120 to deform the annular band 120 away from the stator body 114. FIG. 2A illustrates eight radially extending members 130.

Figure 2B:
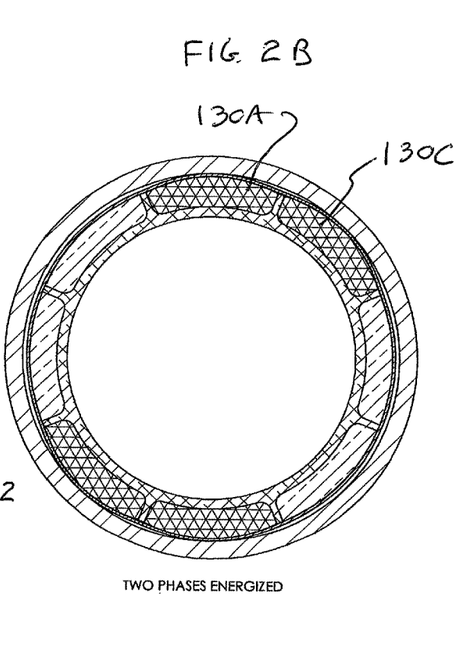

A generally cylindrical rotor 140 surrounds the stator body 114 and has a wall 144 with an inner surface 146 having an inner circumference C2. The outer circumference C1 of the annular band 120 is less than the inner circumference C2 of the rotor 140. As illustrated in FIG. 2A, radially extendable members 130A and 130B are in an extended position whereby the annular band 120 contacts the inner surface 146 of the rotor 140 at contact regions R1 and R2. As a result, a portion of the annular band 120 does not contact, or lightly contacts, the inner surface 146 of the rotor wall 144 in at least gap regions G1, G2. The gaps G1, G2 are a function of the difference in the circumference C1 of the outer surface 124 of the annular band 120 and C2 of the inner surface 146 of the rotor 140. Simply stated, by applying pressure by using the radially extendable members 130 and retracting and extending them in a pattern such as the sequences (a)-(h) illustrated in FIG. 2, there is relative rotational motion between the annular band 120 and the rotor 140. Therefore, with the annular band 120 rotationally secured to the stator 110 and as the radially extending members 130 are retracted and extended sequentially, as illustrated in sequences (a)-(h) of FIG. 2, the rotor 140 travels in a counter-clockwise direction. A driver 160 (FIG. 2A) is connected to each of the extendable members 130 to extend and retract each extendable member 130, as necessary. As illustrated in FIG. 2B, in order to minimize slippage between the annular band 120 and the stator 110, during the transition of extending adjacent expandable members 130, in one embodiment, prior to releasing an extendable member 130A, an adjacent extendable member 130C is extended. This is also illustrated in FIG. 2(*b*). Through continuous sequencing in such a manner as illustrated in FIG. 2, portions of the entire circumference C1 of the annular band 120 may be radially extended thereby providing continuous counter-clockwise displacement of the rotor 140.

As illustrated in FIG. 2A, the stator body 114 may be cylindrical.

The ability of the deformation of the annular band 120 to drive the rotor 140 is based upon friction between the outer surface 124 of the annular band 120 and the inner surface 146 of the rotor wall 140. Contact between the outer surface 124 of the annular band 120 and the inner surface 146 of the rotor 140 may have a coefficient or friction of between 0.01 and 2.0. Furthermore, the outer surface 124 of the annular band 120 may be selected from one of metal, plastic, rubber, and composites thereof while the inner surface 146 of the rotor wall 144 may be selected from one of metal, plastic, rubber, and composites thereof. In one embodiment, the outer surface 124 of the annular band 120 may be made from a liquid crystal aromatic polyester fiber. The inner surface 146 of the rotor wall 144 may be made of aluminum. Furthermore, the outer surface 124 of the annular band 120 may be textured to provide a friction surface.

Finally, the inner surface of the rotor wall 144 may have teeth (not shown) extending radially inwardly to engage the outer surface 124 of the annular band 120, which would not have teeth.

FIGS. 3-12 illustrate one embodiment of the subject invention. The reference numbers used herein will be the same as those used to describe the elements of FIGS. 2A and 2B but will be incremented by 100.

Figure 3:
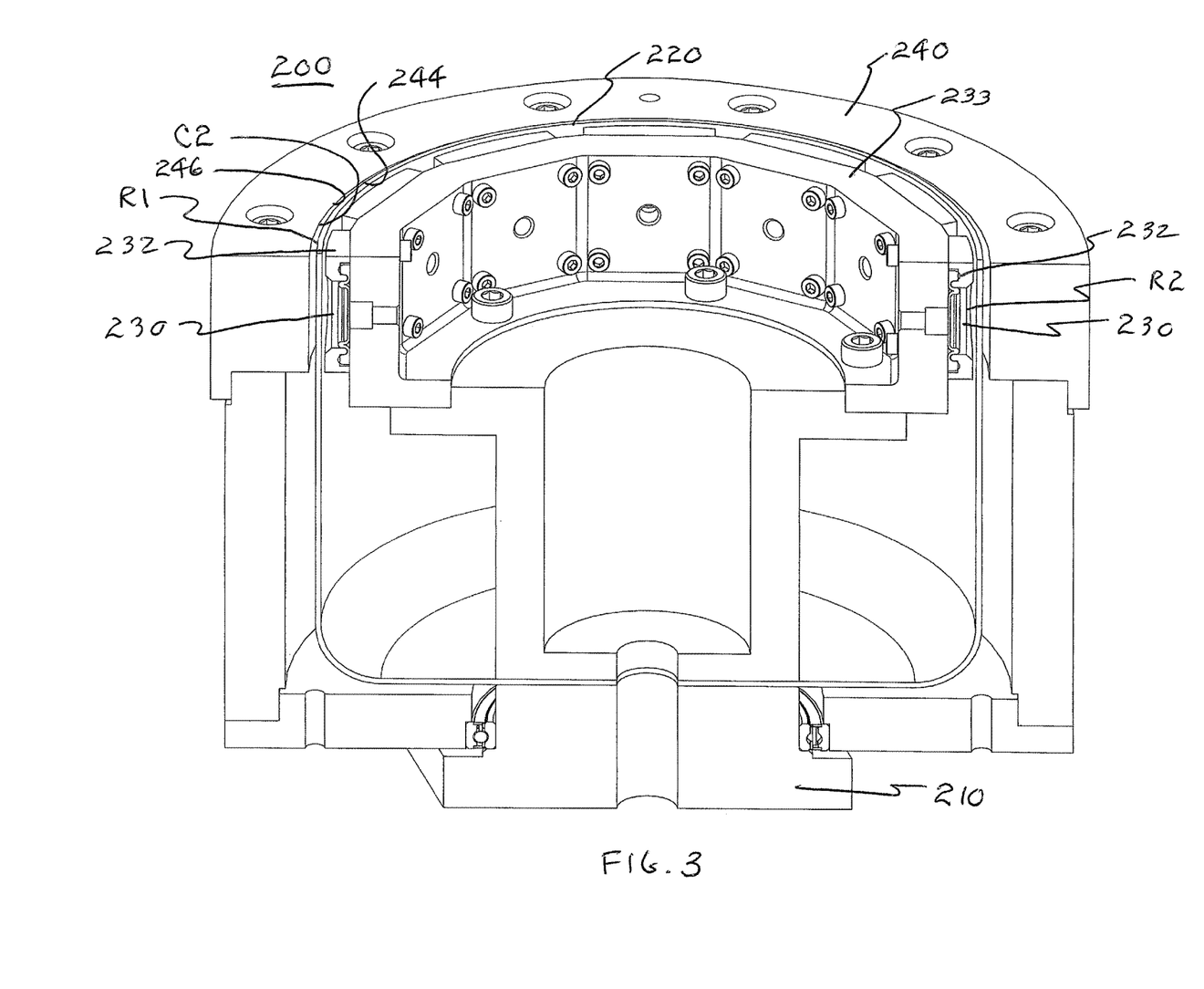
FIG. 3 is a cross-sectional view of a fluidic rotary joint according to the present disclosure.
Figure 4:
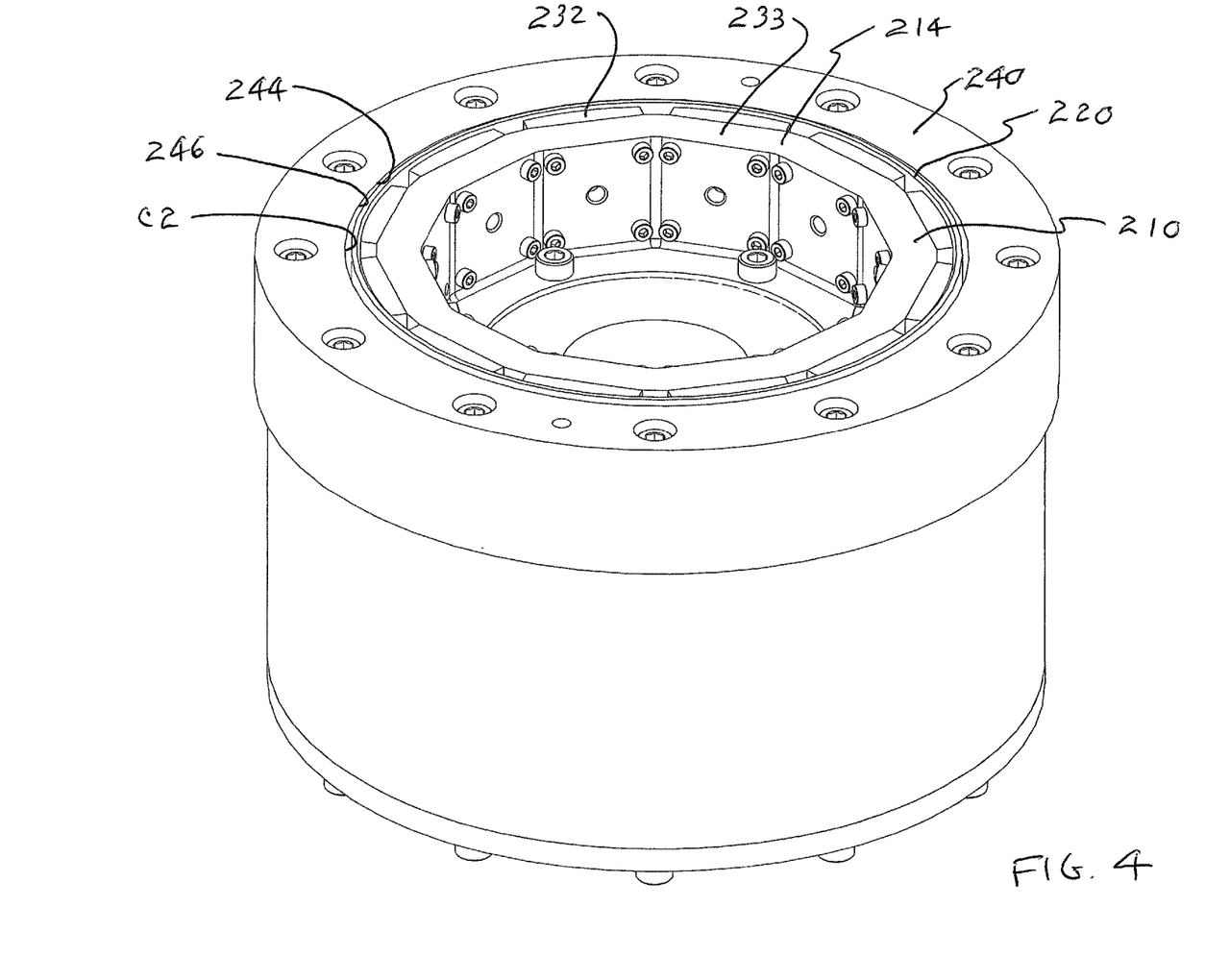
FIG. 4 is a perspective view of a complete view of the cross-section illustration in FIG. 3.
Figure 5:
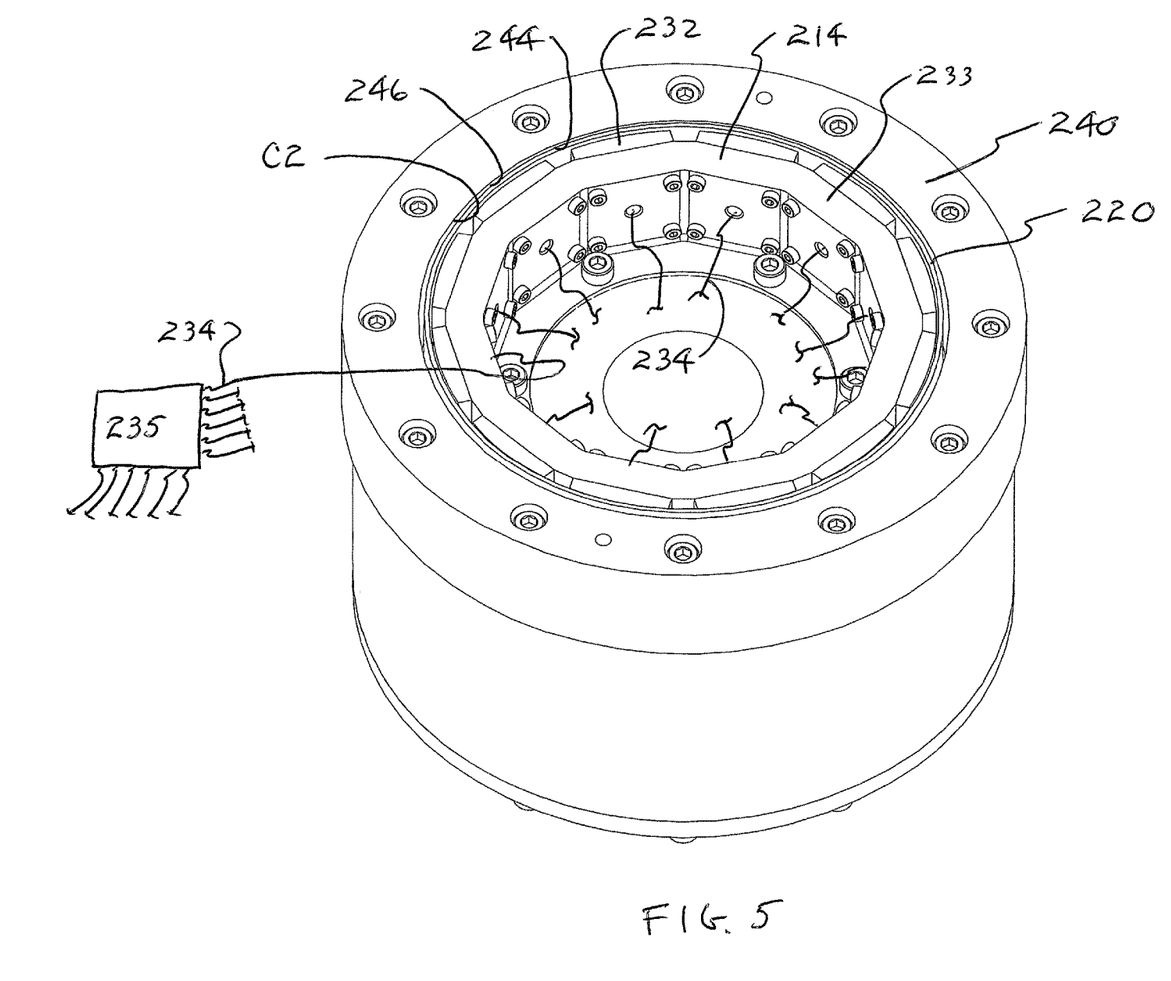
FIG. 5 is a perspective view of the fluidic rotary joint with a schematic of the associated hardware according to the present disclosure.

A detailed model of the fluidic rotary joint is shown in FIGS. 3-5. This design consists of a fixed stator that may include twelve (12) fluidic diaphragms, or radially extending members 230 mounted in retainer plates 232 of a drive ring 233 inside the flex spline, which is an annular band 220. The flex spline will then push against the circular spline that makes up the rotor 240 of the fludic rotary joint 200. A friction material is fixed to the outside of the flex spline annular band 220 to provide the shear contact area between the surfaces that will drive the rotor 240. The pneumatic drive ring 233 is part of the rotor 240 and is fixed so that pneumatic air lines 234 (FIG. 5) associated with the extendable members 230 are stationary. The air lines 234 are pressurized and depressurized by a controller 235. The circular spline of the rotor 240 is the output of the gear box, enabling continuous rotation of the output of the drive.

Figure 6:
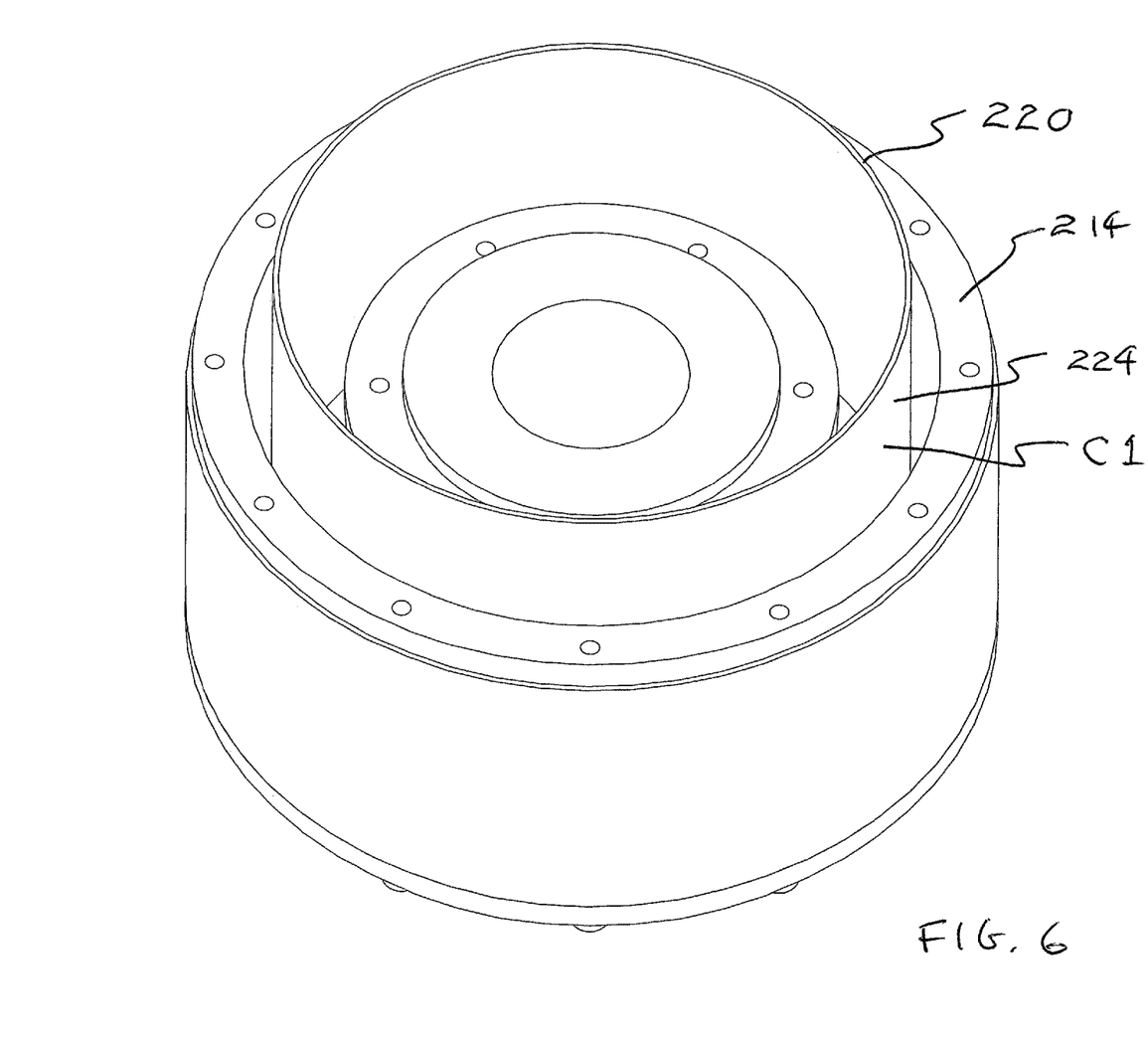
FIG. 6 is a perspective view of the fluidic rotary joint with a pneumatic drive ring assembly and circular spline removed.
Figure 7:
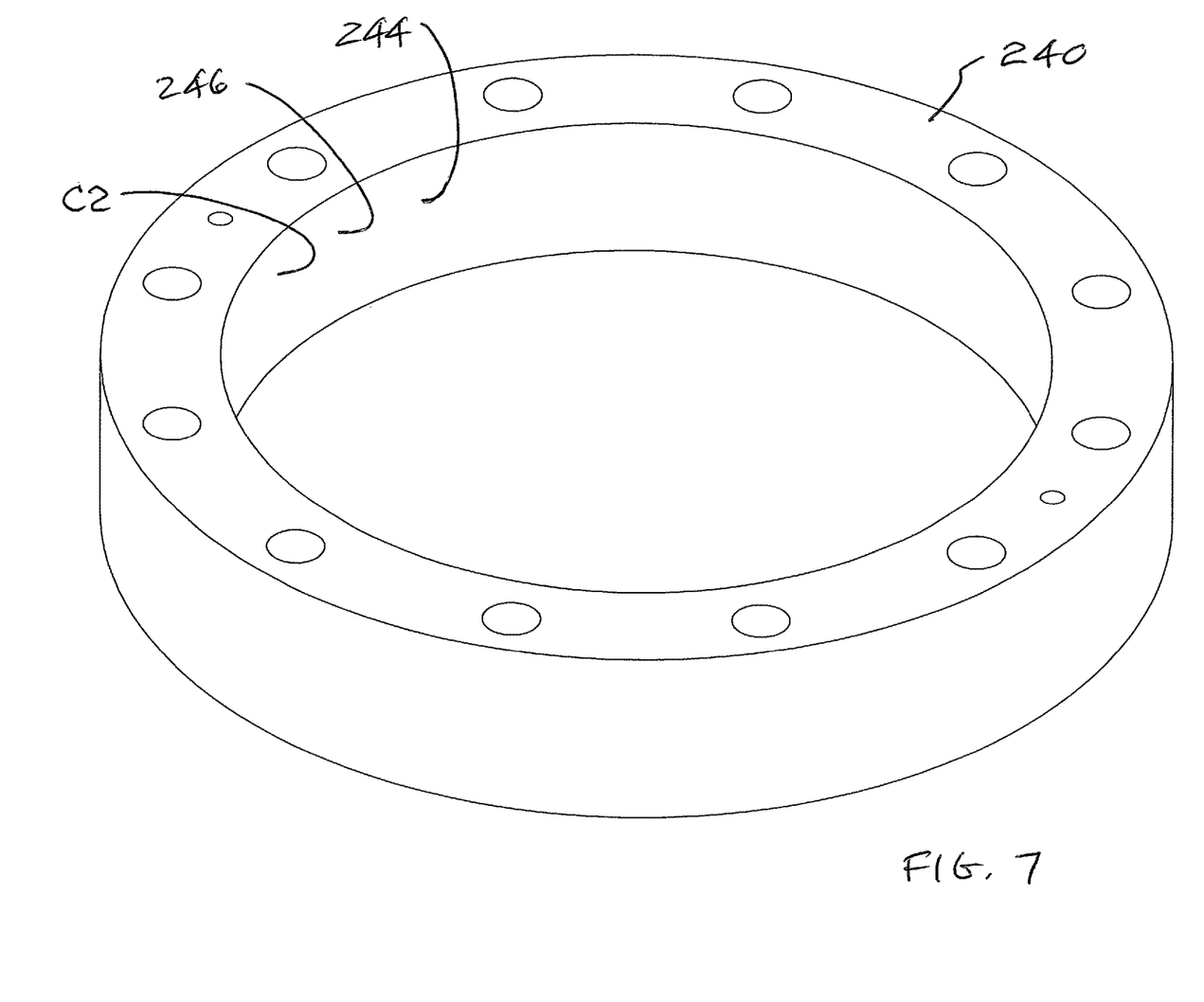
FIG. 7 is a perspective view of the circular spline of the fluidic rotary joint with no friction treatment on the surface.

FIG. 6 shows the thin wall flex spline 220 with 1.13" wide elastomeric material (the friction material) bonded to the outer diameter of the flex spline adjacent to its open end. FIG. 7 shows the rotor 240.

Figures 8A, 8B:
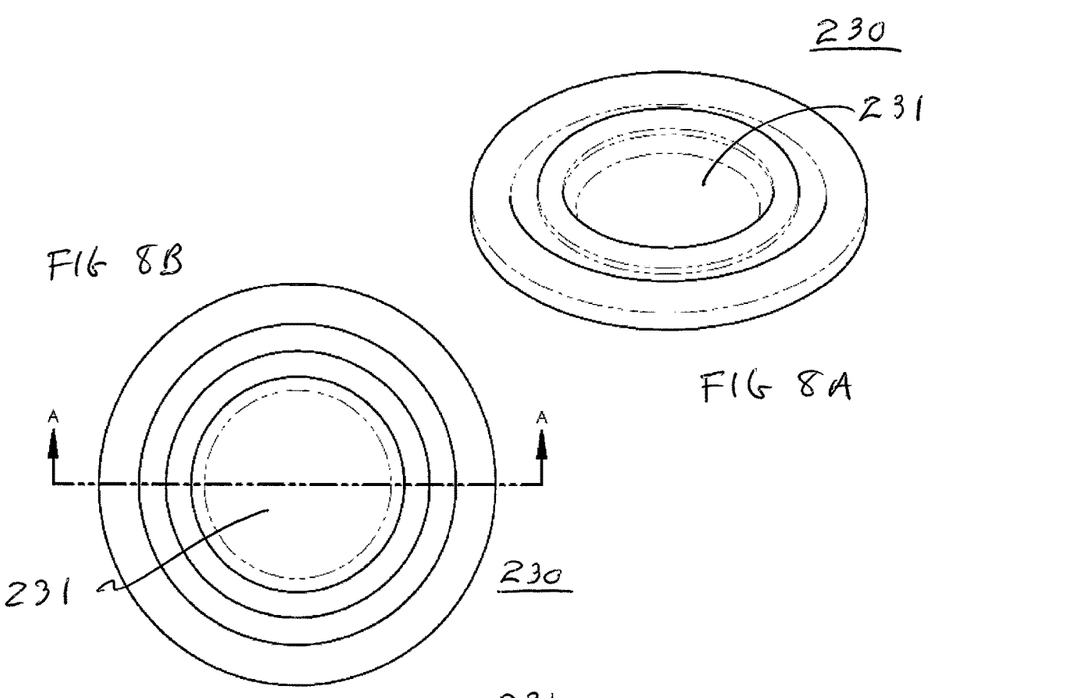
FIGS. 8A, 8B and 8C show one extendable member in perspective, in top view and in cross-section, respectively.
Figure 8C:
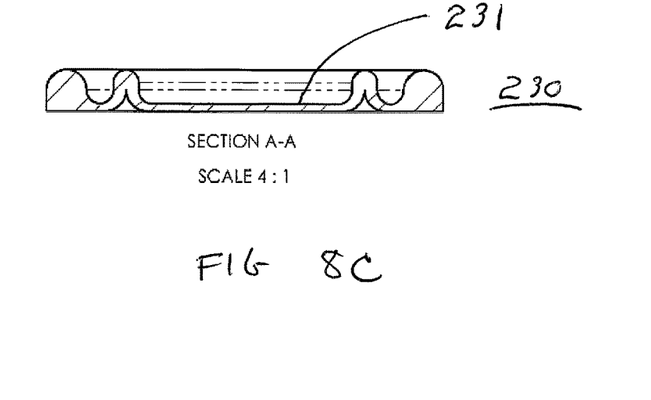

The mechanical wave generator of the prior art has been replaced with a virtual wave generator by sequencing the inflation and deflation of pneumatic actuators arranged around the outside of a fluidic drive ring 233. To drive a harmonic drivetrain, the force from the extendable members 230 on the inside of the flex spline 220 must be sufficient to deform the spline 220 and generate a normal force on the drive interface between the flex spline 220 and the circular spline of the rotor 240. In one embodiment, fiber reinforced diaphragms may be used. Such a diaphragm is capable of supporting up to a 150 psi differential pressure without failure and will apply a force in the piston direction across the area of the face of the diaphragm. FIGS. 8A-8C show the size of the diaphragm, the direction of actuation, and the effective area that applies force to the flex spline. The diaphragm, or expandable member 230, is shown in the deflated, or collapsed, configuration. The central region 231 is urged upwardly (FIG. 8C) when the diaphragm 230 is pressurized such that contact is made with the annular band 220 (FIG. 6) to urge it radially outward against the inner surface 246 (FIG. 7) of the wall 244 of the rotor 240. Approximately 40 psi of pressure in the diaphragm, across two opposing diaphragms in the drive ring, will generate sufficient deflection in the flex spline to push out against the circular spline. Since the joint torque capability should increase linearly with pressure, the highest practical operating pressure up to 150 psi should be used.

Figure 9:
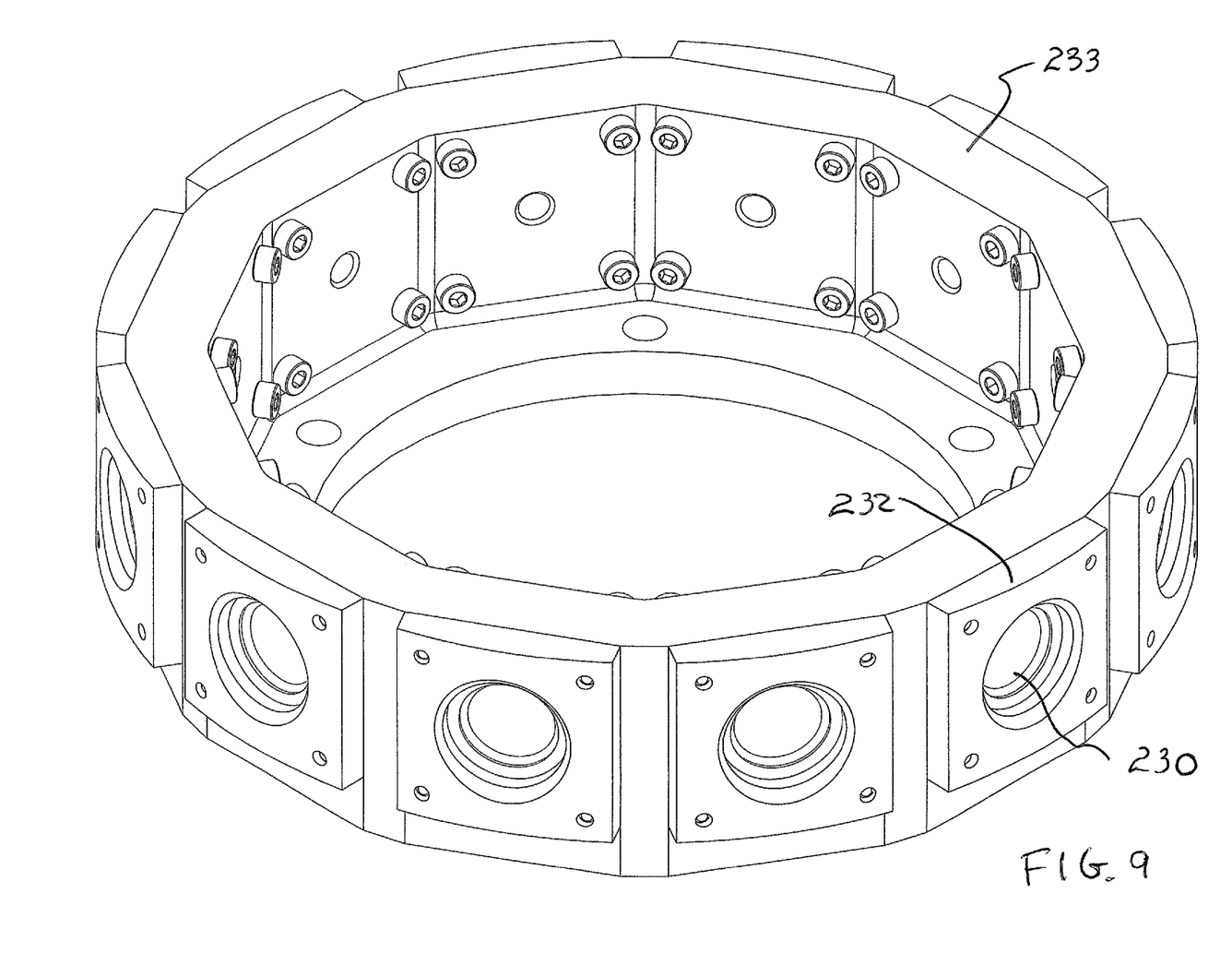
FIG. 9 is a perspective view of a pneumatic drive ring with diaphragms installed.

The pneumatic drive ring 233 is designed to provide the tightest packaging possible of diaphragms used for the drivetrain. The drive ring is a single continuous ring to efficiently react to the pneumatic actuator forces in the plane of the actuators. The retainer plates 232 are assembled to the pneumatic ring 233 of the stator 210 and machined to slightly less than the anticipated inner minor diameter of the flex spline 220. The precision contour supports the energized flex spline minor diameter for torque transmission. Also, maintaining a minimum gap between the drive ring outer diameter and the flex spline helps to minimize the portion of the diaphragm that is radially unsupported. FIG. 9 shows the fabricated and assembled pneumatic drive ring 233 with the diaphragms 230 (extendable members) in the deflated configuration. As mentioned, pneumatic lines 234 (FIG. 5) are used to inflate or deflate the diaphragms 230 as needed. The drive ring 233 is directly attached to the stator body 214 (FIG. 3) and is therefore considered to be a part of the stator 210.

Figure 10A:
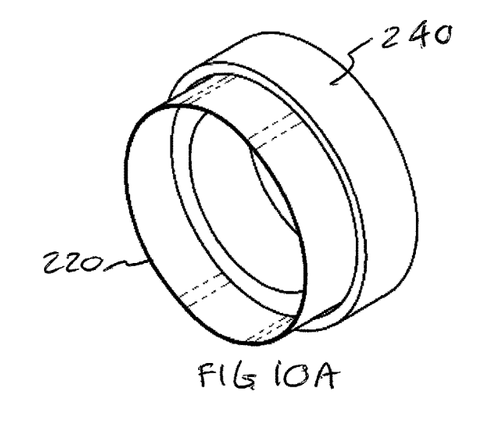
FIGS. 10A and 10B are perspective and side views of the annular band attached to the stator.
Figure 10B:
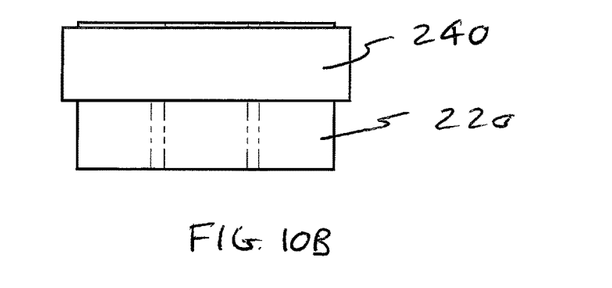
Figure 11:
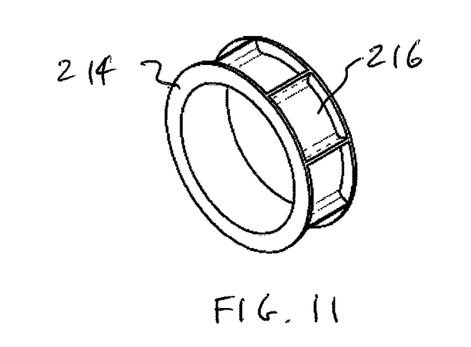
FIG. 11 is a perspective view of the stator body.
Figure 12:
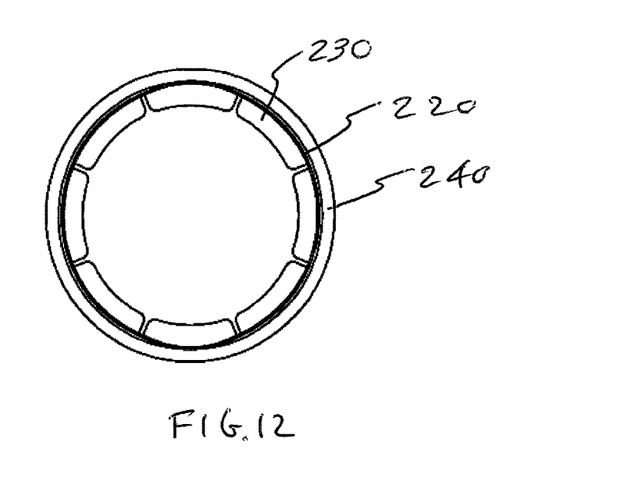
FIG. 12 is a side view of the annular band mounted within the stator body.

Directing attention to FIGS. 10A and 10B, the annular ring 220 is mounted to the rotor 240. As seen in FIGS. 11 and 12, the expandable members 230 are mounted within pockets 216 of the stator body 214. Only the outline of the stator body 214 is seen in FIG. 12. However, the mechanism by which the expandable members 230 urge the annular ring 220 against the rotor 240 is apparant.

Current harmonic drives utilize toothed surfaces to generate the driving torque for the mechanism. To reduce cost and complexity, the present disclosure uses a friction material in the interface between the flex spline 220 and the circular spline of the rotor 240.

As applied to the embodiment illustrated in FIGS. 3-12, a generally cylindrical rotor 240 surrounds the stator body 214 and has a wall 244 with an inner surface 246 having an inner circumference C2. The outer circumference C1 of the annular band 220 is less than the inner circumference C2 of the rotor 240. As illustrated in FIG. 2*a*, radially extendable members 230A and 230B are in an extended position whereby the annular band 220 contacts the inner surface 246 of the rotor 240 at contact regions R1 and R2. By applying pressure by using the radially extendable members 130 and retracting and extending them in a pattern such as the sequence illustrated in FIGS. 2*a*-2*h*, there is relative rotational motion between and annular band 220 and the rotor 240. Therefore, with the annular band 220 rotationally secured to the stator 110 then as the radially extending members 130 are retracted and extended sequentially, the rotor 240 travels in a rotational direction. A driver (not shown) is connected to each of the extendable members 130 to extend and retract each extendable member 130, as necessary. Through continuous sequencing of the extendable members 230, portions of the entire circumference C1 of the annular band 220 may be extended thereby providing continuous counter-clockwise displacement of the rotor 240.

While the extendable member discussed herein has been directed to a diaphragm nested within a retainer plate, it is possible for the extendable member to be an independently inflatable bladder not nested within the retainer plate.

At least two other materials may also be utilized to provide friction between the deformable annular band and the rotor: Neoprene Rubber, 40A durometer and 3M Gripping Material, GM110, nylon backed.

Figure 13:
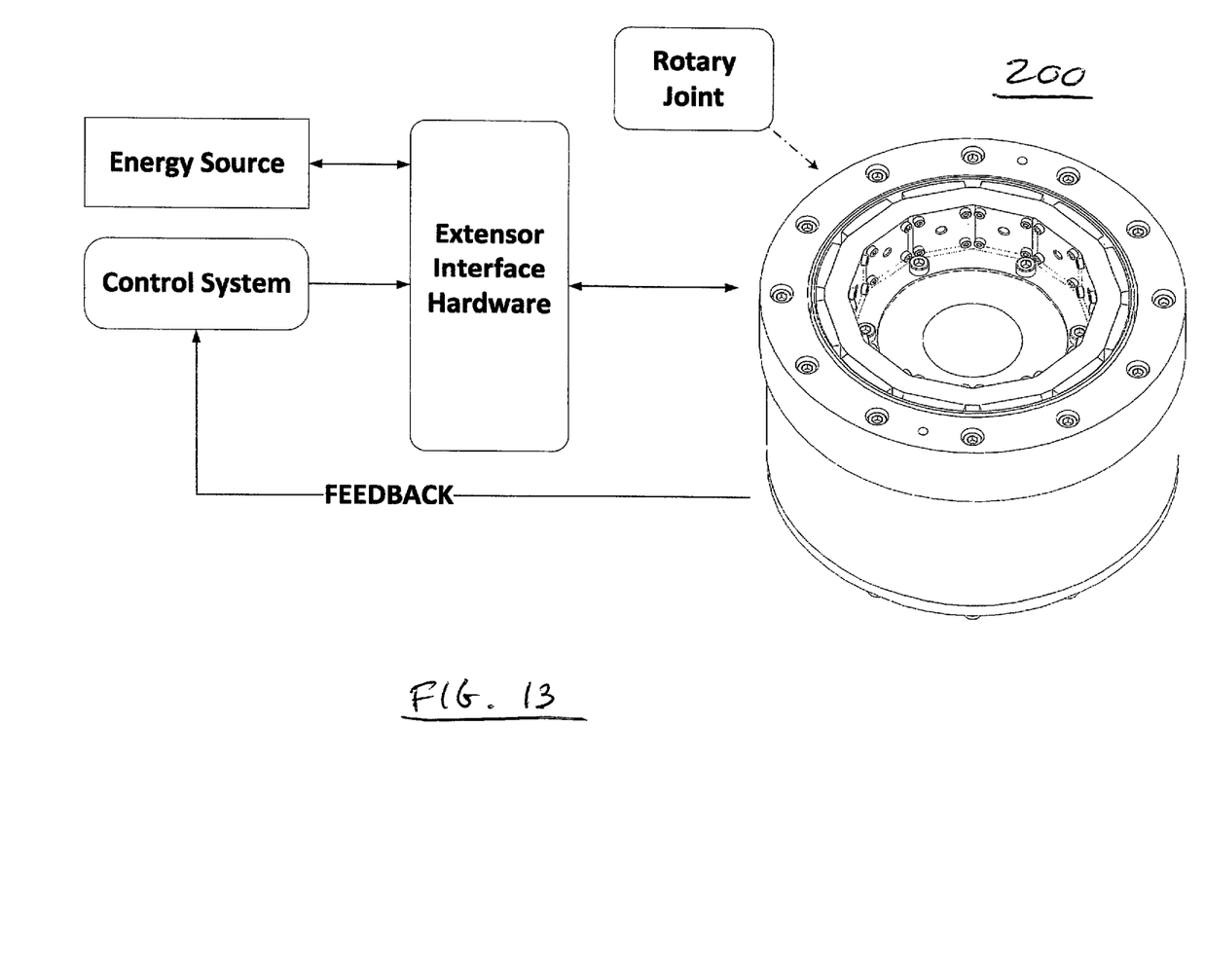
FIG. 13 is a schematic of the fluidic rotary joint with associated elements to operate the fluidic rotary joint.
Figure 14:
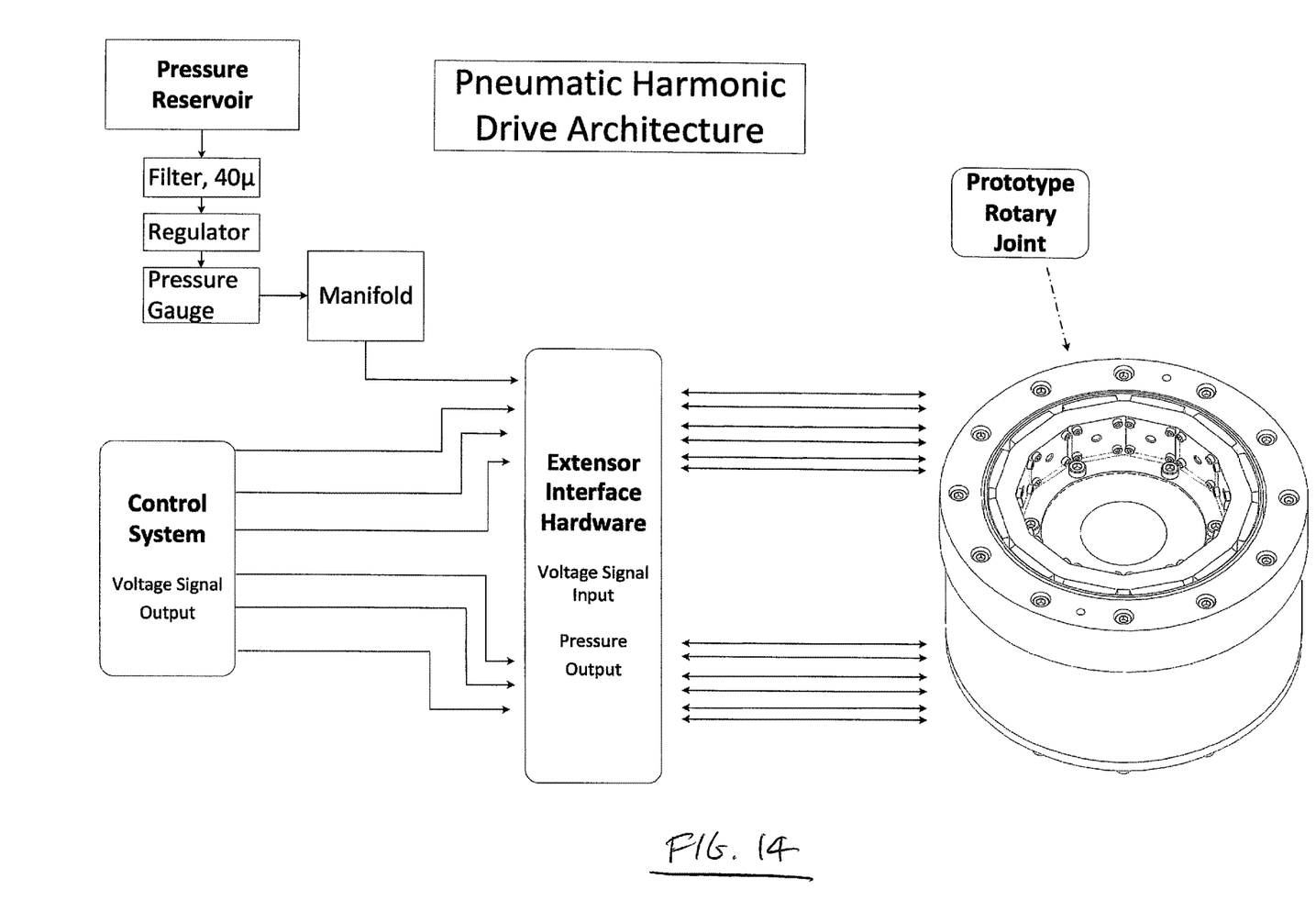
FIG. 14 is an expanded schematic of an overall system architecture plan according to the present disclosure.

FIG. 13 is the system for the operation of the fluidic rotary joint 200 while FIG. 14 is an expansion of the details of FIG. 13. In particular, the overall system to provide the functionality of the fluidic harmonic drive is shown in FIG. 14. Operation of the system requires a regulated compressed air source, a bay of pneumatic valves to energize or vent the pneumatic actuator chambers, a power source for the pneumatic valves, electrical switches to sequence the actuator states, wiring to the pneumatic valves, hoses from the air source to the valves and pneumatic actuator chambers, and the rotary joint of the present disclosure.

The material utilized in the system of the present disclosure may be coated with a liquid crystal aromatic polyester fiber. This material is lightweight, strong, and flex-fold damage resistant. With the coating, it can be made watertight. A laminated, hermetically sealed version, may be 0.015" thick and weigh 0.71 bs/square yard.

The conceptual design for a fluidic harmonic drivetrain presented in the disclosure was adapted to available commercial off-the-shelf components combined with custom manufactured components. The objective goal of +/−90° of rotation was achieved with a design capable of continuous roll motion and generating appreciable torque. The drivetrain is also capable of fine, deterministic motion, necessary for the precise positioning of objects called for in the program solicitation. The capability requirements for the inflatable structure and pitch joints were analyzed based on application requirements and the additional capability drivers imposed on the system by the fluidic harmonic drivetrain. The pressures required to resist buckling and provide more deterministic motion were calculated.

The fluidic harmonic drivetrain was successfully driven and shown to be capable of both precision stepping motion and large-scale continuous rotation. The resolution of the drivetrain, based on the design with 12 inflatable diaphragms distributed around the circumference of the drivetrain, was measured to be 0.22°. The resulting virtual gear ratio of the drivetrain is 134:1, and is driven by the ratio of the number of virtual revolutions of the deformation wave generated by the diaphragms to the output motion of the circular spline. The expected gear ratio is the ratio of the diameter of the circular spline divided by the difference in diameters of the circular and flex splines, as was shown in the section on Fluidic rotary joint Design:

$$\text{Gear Ratio} = \frac{5.620 \text{ in}}{5.620 \text{ in} - (5.620 - 2*.025)} = 112.4$$

It can be seen that the gear ratio is sensitive to the radial gap that was nominally intended to be 0.025" between the flex spline outer diameter and the circular spline inner diameter. Back-solving for the actual gap based on the measured 134:1 gear ratio yields an as-built gap of 0.021". The small 0.004" discrepancy can be explained by variations in actual part dimensions relative to the nominal values, and adhesive thickness variation between the neoprene rubber and the flex spline.

The harmonic drivetrain is also capable of resisting significant torque. The torque coupling features of the present disclosure were used to determine static holding torques with two sets of pneumatic diaphragms pressurized.

This harmonic drivetrain, utilizing simple fluidic actuators and inexpensive torque transfer material, enables motion that has not been possible with existing fluidic actuators.

The invention is also directed to a method for using the fluid rotary joint comprising method for using the fluid rotary joint of claim 1 comprising the steps of a) expanding at least one of the at least three radially extendable members 130 at a pressure greater than the remaining members 130 to deform the annular band 120 against the inner surface 146 of the rotor 140 thereby providing friction between the annular band 120 and the inner surface 146 of the rotor 140; and b) increasing pressure on an adjacent extendable member 130 and relieving the pressure on the at least one extendable member 130 to create relative motion between the annular band 120 and the rotor 140.

By extending and releasing the extendable members 230 in a rotational sequence, the annular band 120 may be advanced in a single direction along the inner surface 146 of the rotor 140. Furthermore, it is possible prior to releasing an extendable member 130 to extend an adjacent member 130 to prevent slippage between the annular band 120 and the rotor 140. Additionally, two or more extendable members 130 may be extended simultaneously to provide greater contact area between the extendable members 130 and the inner surface 146 of the rotor 140.

Furthermore, it is possible to relieve pressure among all of the members 130 such that friction between the annular band 120 and the rotor 140 is de minimus and the annular band 120 may move freely relative to the rotor 140 to produce a freewheeling configuration between the stator 110 and rotor 140.

Finally, the pressure of the annular members 130 may be controlled such that friction between the annular band 120 and the rotor 140 is varied such that the torque transmission between the stator 110 and the rotor 140 may be controlled.

While several aspects of fluid rotary joint are shown in the accompanying figures and described hereinabove in detail, other aspects will be apparent to, and readily made by, those skilled in the art without departing from the scope and spirit of the disclosure. For example, it is to be understood that this disclosure contemplates that, to the extent possible, one or more features of any aspect can be combined with one or more features of any other aspect. Accordingly, the foregoing description is intended to be illustrative rather than restrictive.

The invention claimed is:

1. A fluid rotary joint comprising:
   a) a stator having:
      1) a generally curved stator body,
      2) a flex spline with a flexible annular band disposed about and secured to the stator body, wherein the annular band has an outer surface with an outer circumference and a high tensile strength in the direction of the circumference; and 3) at least three radially extendable members disposed between the stator body and the annular band to deform the annular band away from the stator body;

b) a generally cylindrical rotor surrounding the stator body, wherein a rotor has a wall with an inner surface having an inner circumference;

c) wherein the outer circumference of the annular band is less than the inner circumference of the rotor;

d) a driver for selectively expanding the extendable members and bringing the outer surface of the annular band of the stator into frictional driving engagement with the inner surface of the rotor for rotating the rotor.

2. The fluid rotary joint in accordance with claim 1, wherein the extendable members are equally spaced around the outer surface of the stator.

3. The fluid rotary joint in accordance with claim 2, wherein there are at least eight extendable members.

4. The fluid rotary joint in accordance with claim 1, wherein the stator body is cylindrical.

5. The fluid rotary joint in accordance with claim 1, wherein the contact between the outer surface of the annular band and the inner surface of the rotor has a coefficient of friction between 0.01 and 2.0.

6. The fluid rotary joint in accordance with claim 1, wherein the outer surface of the annular band is one selected from metal, plastic, rubber and composites thereof and the inner surface of the rotor is one selected from metal, plastic rubber and composites thereof.

7. The fluid rotary joint in accordance with claim 1, wherein the outer surface of the annular band is made from a liquid crystal aromatic polyester fiber and the inner surface of the rotor wall is made of aluminum.

8. The fluid rotary joint in accordance with claim 1, wherein the outer surface of the annular band is textured to provide a friction surface.

9. The fluid rotary joint in accordance with claim 1, wherein the inner surface of the rotor has teeth extending radially inwardly to engage the outer surface of the annular band.

10. The fluid rotary joint in accordance with claim 1, wherein each extendable member is a flexible inflatable diaphragm.

11. The fluid rotary joint in accordance with claim 1, wherein each extendable member is an inflatable bladder.

12. The fluid rotary joint in accordance with claim 1, wherein the annular band is supported around the circumference of the stator.

13. A method for using the fluid rotary joint of claim 1 comprising the steps of:

a) expanding at least one of the at least three radially extendable members at a pressure greater than the remaining members to deform the band against the inner surface of the rotor thereby providing friction between the band and the inner surface of the rotor;

b) increasing pressure on an adjacent extendable member and relieving the pressure on the at least one extendable member to create relative motion between the annular band and the rotor.

14. The method in accordance with claim 13, wherein the extendable members are extended and released in a rotational sequence such that the annular band advances in a single direction along the inner surface of the rotor.

15. The method in accordance with claim 14, wherein prior to releasing an extendable member, an adjacent extendable member is extended to prevent slippage between the annular band and the rotor.

16. The method in accordance with claim 13, wherein two or more extendable members may be extended simultaneously to provide a greater contact area between the extendable members and the inner surface of the rotor.

17. The method according to claim 13, further including the step of relieving pressure among all of the members such that friction between the band and the rotor is de minimus and the band may move freely relative to the rotor to produce a freewheeling configuration between the stator and rotor.

18. The method according to claim 13, further including the step of controlling the pressure among all of the members such that friction between the annular band and the rotor is varied such that the torque transmission between the stator and the rotor may be controlled.

* * * * *